(12) United States Patent
Huang

(10) Patent No.: US 9,874,788 B2
(45) Date of Patent: Jan. 23, 2018

(54) DISPLAY PANEL, METHOD OF MANUFACTURING THE SAME, AND DISPLAY DEVICE

(71) Applicant: BOE TECHNOLOGY GROUP CO., LTD., Beijing (CN)

(72) Inventor: Hua Huang, Beijing (CN)

(73) Assignee: BOE TECHNNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 15/213,141

(22) Filed: Jul. 18, 2016

(65) Prior Publication Data
US 2017/0123255 A1    May 4, 2017

(30) Foreign Application Priority Data

Nov. 3, 2015    (CN) .......................... 2015 1 0737391

(51) Int. Cl.
*G02F 1/1339*    (2006.01)
(52) U.S. Cl.
CPC ...... *G02F 1/13394* (2013.01); *G02F 2202/28* (2013.01)
(58) Field of Classification Search
CPC ............ G02F 1/13392; G02F 1/13396; G02F 1/13398; G02F 1/133377; G02F 1/13394; G02F 2202/28; H01L 27/3246
See application file for complete search history.

(56) References Cited

U.S. PATENT DOCUMENTS 6,166,797 A * 12/2000 Bruzzone ............ G02F 1/13394
349/155
2005/0163940 A1* 7/2005 Liang .................... B29C 43/021
428/1.1

(Continued)

FOREIGN PATENT DOCUMENTS

CN    1319197 A    10/2001
CN    1825179 A    8/2006
(Continued)

OTHER PUBLICATIONS

English translation of first Chinese Office Action for corresponding Chinese Application No. 201510737391.X.

(Continued)

*Primary Examiner* — Joseph L Williams
*Assistant Examiner* — Jose M Diaz
(74) *Attorney, Agent, or Firm* — Kinney & Lange, P.A.

(57) ABSTRACT

A display panel, a method of manufacturing the display panel and a display device including the display panel are disclosed. The display panel includes a first substrate; a second substrate disposed opposite to the first substrate; a plurality of supporting posts disposed on a side surface of the first substrate facing the second substrate; and a plurality of adhering parts disposed on a side surface of the second substrate facing the first substrate, each of the plurality of adhering parts corresponding to the plurality of supporting posts respectively. Two opposite side surfaces of each of the plurality of adhering parts are respectively in contact with the corresponding one of the plurality of supporting posts and the second substrate to adhere the corresponding one of the plurality of supporting posts to the second substrate.

15 Claims, 2 Drawing Sheets

(56) References Cited

U.S. PATENT DOCUMENTS

| | | | |
|---|---|---|---|
| 2005/0190338 A1* | 9/2005 | Lim | G02F 1/13394 349/156 |
| 2006/0087479 A1* | 4/2006 | Sakurai | G02F 1/167 345/48 |
| 2006/0285059 A1* | 12/2006 | Takagi | G02F 1/13394 349/156 |
| 2009/0033859 A1 | 2/2009 | Ueda et al. | |
| 2009/0079927 A1* | 3/2009 | Yamamoto | G02F 1/13394 349/155 |
| 2012/0236236 A1* | 9/2012 | Sung | G02F 1/13392 349/106 |
| 2015/0146147 A1* | 5/2015 | Choi | G02F 1/1333 349/123 |
| 2017/0090237 A1* | 3/2017 | Kim | G02F 1/13471 |
| 2017/0115525 A1* | 4/2017 | Okita | G02F 1/133512 |

FOREIGN PATENT DOCUMENTS

| | | |
|---|---|---|
| CN | 101322070 A | 12/2008 |
| CN | 201319099 Y | 9/2009 |
| CN | 202067050 U | 12/2011 |
| CN | 202710883 U | 1/2013 |
| CN | 104375331 A | 2/2015 |

OTHER PUBLICATIONS

Chinese Rejection Decision, for Chinese Patent Application No. 201510737391X, dated Dec. 30, 2016, 9 pages.
Second Chinese Office Action dated Sep. 6, 2016, for corresponding Chinese Application No. 201510737391.X.

* cited by examiner

DISPLAY PANEL, METHOD OF MANUFACTURING THE SAME, AND DISPLAY DEVICE

CROSS-REFERENCE TO RELATED APPLICATION

This application claims benefits of Chinese Patent Application No. 201510737391.X filed on Nov. 3, 2015 in the State Intellectual Property Office of China, a whole disclosure of which is incorporated herein by reference.

BACKGROUND

Field of the Invention

Embodiments of the invention relate to the field of display technology, and specifically, to a display panel, a method of manufacturing the same, and a display device.

Description of the Related Art

With development of wireless mobile communication, information display devices and display panels are widely used as communication terminal devices. At the same time, to solve a problem that a glass substrate will be broken when the device falls, a material of the substrate of the terminal device having a mobile communication function has been changed from glass to plastic, such that a flexible display becomes possible.

In a typical display device, characteristics such as response speed, contrast ratio, visual angle, brightness uniformity and the like are associated with the thickness of the liquid crystal layer, i.e., the spacing between substrates. Therefore, to maintain a uniform spacing between substrates in typical display device, spherical pads are arranged within the space between the substrates.

However, as a plastic substrate is flexible, when the plastic substrate is bent or curled like a paper, the spherical pads are very likely to be moved to arbitrary positions, such that agglomeration of spherical pads occurs in an active region. On one hand, it may lead to non-uniformity in brightness in a certain tone during displaying, and on the other hand, the spherical pads distributed in the space between the substrates for maintaining the spacing of the substrates will lead to a small adhering area between the substrates, resulting in a small bonding strength.

SUMMARY

Embodiments of the invention have been made to overcome or alleviate at least one aspect of the above mentioned disadvantages.

Accordingly, it is an object of the invention to provide a display panel, a display device comprising the display panel, and a method for manufacturing the display panel.

According to an aspect of the invention, there is provided a display panel.

In an exemplary embodiment, the display panel may comprise: a first substrate; a second substrate disposed opposite to the first substrate; a plurality of supporting posts disposed on a side surface of the first substrate facing the second substrate; and a plurality of adhering parts disposed on a side surface of the second substrate facing the first substrate, each of the plurality of adhering parts corresponding to the plurality of supporting posts respectively. Two opposite side surfaces of each of the plurality of adhering parts are respectively in contact with the corresponding one of the plurality of supporting posts and the second substrate to adhere the corresponding one of the plurality of supporting posts to the second substrate.

In a further embodiment, the side surface of the second substrate facing the first substrate may be provided with a plurality of recesses in regions thereof respectively corresponding to the plurality of supporting posts, the plurality of adhering parts being disposed in the plurality of recesses respectively.

In a still further embodiment, an orthogonal projection of a top of each of the supporting posts on the second substrate may fall within an orthogonal projection of an upper surface of a corresponding one of the plurality of adhering parts on the second substrate.

In a still further embodiment, upper surfaces of the adhering parts may be flush with the side surface of the second substrate facing the first substrate.

In a still further embodiment, the adhering parts may be formed of a pressure-sensitive adhesive material.

In a still further embodiment, the adhering parts may be formed of a hot melt pressure-sensitive adhesive material.

In a still further embodiment, the supporting posts may be formed of any one of a plastic material and a resin material.

According to another aspect of the invention, there is provided a display panel.

In an exemplary embodiment, the display device may comprise the display panel according to any one of the above embodiments.

According to a further aspect of the invention, there is provided a method for manufacturing a display panel.

In an exemplary embodiment, the method may comprise steps of: providing a first substrate provided thereon with a plurality of supporting posts; providing a second substrate; forming a plurality of adhering parts in regions of the second substrate respectively corresponding to the plurality of supporting posts; and assembling the first substrate and the second substrate in a manner of placing them opposite to each other, such that the plurality of supporting posts on the first substrate are in contact with the plurality of adhering parts on the second substrate respectively.

In a further embodiment, the step of forming the plurality of adhering parts in the regions of the second substrate may comprise: forming a plurality of recesses in the respective regions of the second substrate corresponding to the plurality of supporting posts; and applying a molten pressure-sensitive adhesive into the plurality of recesses through ink-jet printing to form the plurality of adhering parts.

In a still further embodiment, after the step of forming the plurality of adhering parts in the regions of the second substrate, the method may further comprise: heating the second substrate to melt the plurality of adhering parts; and cooling the second substrate to cool and solidify the molten adhering parts.

In a still further embodiment, a temperature for the heating may be in a range from 140 degrees Celsius to 160 degrees Celsius, and a period of time for the heating may be in a range from 30 seconds to 120 seconds.

In a still further embodiment, the step of assembling the first substrate and the second substrate in a manner of placing them opposite to each other may comprise: disposing the first substrate and the second substrate to be opposite to each other; and applying a first pressure to the first substrate in a direction towards the second substrate and applying a second pressure to the second substrate in a direction towards the first substrate simultaneously.

In a still further embodiment, both of the first pressure and the second pressure may be in a range of 2-6 bars, and a period of time for applying the first pressure and the second pressure may be in a range from 6 seconds to 10 seconds In the display panel according to the embodiment of the invention and the display panel manufactured through the method according to the embodiment of the invention, the supporting posts are provided and fixed in the space between the substrates, such that the spacing between the substrates can be maintained in a long period of time, and uniformity of brightness of the display panel can be maintained in a long period of time. Provision of the adhering parts at regions corresponding to the supporting posts may increase bonding strength between the substrates. Moreover, as the adhering parts are disposed in the recesses, the surface of the substrate where the adhering parts are located may have good evenness, and the material for forming the adhering parts may be prevented from spreading out and influencing performances of its peripheral components.

Since the display device according to the embodiment of the invention utilizes the above display panel, it not only has the advantageous of the display panel, but also has a better display effect.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF PREFERRED EMBODIMENTS

Figure 1:
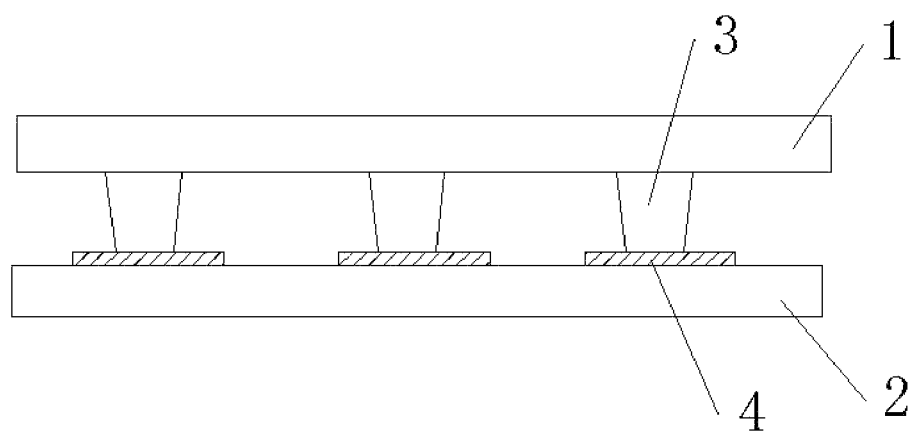
FIG. 1 is an illustrative partial cross-sectional view of a display panel according to a first embodiment of the invention.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In one aspect of the invention, there is provided a display panel.

A display panel according to a first embodiment of the invention is shown in FIG. 1. The display panel includes a first substrate 1 and a second substrate 2 disposed opposite to each other. A plurality of supporting posts 3 are provided at a side of the first substrate 1 facing the second substrate, and a plurality of adhering parts 4 are provided at a side of the second substrate 2 facing the first substrate 1 at regions corresponding to the plurality of supporting posts 3. Each of the plurality of adhering parts 4 corresponds to one of the plurality of supporting posts 3. Two opposite side surfaces of each adhering part 4 are respectively in contact with a corresponding supporting post and the second substrate, so as to adhere the supporting post 3 to the second substrate 2. The first substrate 1 and the second substrate 2 may be flexible substrates. For example, the first substrate is a color filter substrate, and the second substrate is an array substrate. Alternatively, the first substrate is an array substrate, and the second substrate is a color filter substrate.

The first substrate 1 and the supporting posts 3 may be formed integrally from a plastic material or a resin material. The supporting posts 3 are used to maintain a spacing between the substrates. Since the supporting posts 3 are integrally formed on the first substrate 1, they will not move with relative to the first substrate 1 when the display panel is bent or curled, such that the spacing between the substrates can be maintained in a long period of time, and uniformity of brightness of the display panel can be maintained in a long period of time.

Each of the supporting posts 3 may be configured to have a shape of truncated pyramid, or it may be configured to have a shape of a cube or cylinder. Moreover, the supporting posts 3 may be formed at regions through which no light is needed to pass. For example, the supporting posts 3 may be formed at a region corresponding to a black matrix.

In an example, the adhering parts 4 may be formed of a pressure-sensitive adhesive, so as to adhere the supporting posts 3 to the second substrate 2, thereby solving the problem of small adhering area and low bonding strength between the substrates after the supporting posts 3 are disposed and increasing bonding strength between the substrates.

As compared with prior arts, the display panel according to the embodiment of the invention may maintain its thickness during bending and curling due to the adhering parts disposed in the space between the substrates.

Figure 2:
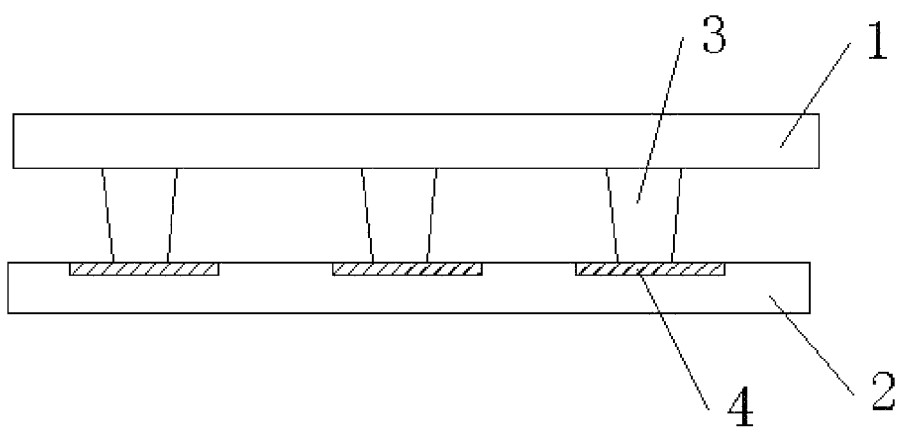
FIG. 2 is an illustrative partial cross-sectional view of a display panel according to a second embodiment of the invention.

FIG. 2 shows a display panel according to a second embodiment of the invention, which has a structure similar to that of the display panel of the first embodiment. A difference of the second embodiment from the first embodiment lies in that the side surface of the second substrate 2 facing the first substrate 1 is provided therein with a plurality of recesses corresponding to the plurality of supporting posts 3, respectively. Each adhering part 4 is disposed in a corresponding recess such that the adhering part 4 may be fixed in place and a contact area between each adhering part 4 and a corresponding supporting post 3 can be as large as possible, thereby obtaining a good bonding effect. Moreover, during formation of the adhering part 4, the material may be prevented from spreading out.

Each of the adhering parts 4 may fill a corresponding recess, and a height thereof is equal to a depth of the corresponding recess, such that the surface of the second substrate 2 may be flat and the material of the adhering parts 4 may be prevented from spreading out and influencing performances of peripheral components.

To facilitate fully filling of an adhering part 4 into its corresponding recess, the adhering part 4 may be formed of a hot melt pressure-sensitive adhesive, such as a polyacrylate type pressure-sensitive adhesive.

To obtain a large contact area and a high bonding strength between the supporting post 3 and the second substrate 2 as much as possible, an area of a surface of the adhering part 4 in contact with the supporting post 3 is large than or equal to an area of a surface of the supporting post 3 in contact with the adhering part 4. That is, an orthogonal projection of the top of the supporting post 3 on the second substrate 2 falls within an upper surface of the adhering part 4. The "top" of the supporting post 3 means an end of the supporting post 3 that is relatively closer to the second substrate 2 than the other end.

It can be appreciated that, in an alternative embodiment, the supporting posts 3 may also be formed on the second substrate 2, and correspondingly, the recesses and the adhering parts 4 are provided in corresponding regions of the first substrate 1. Alternatively, the first substrate 1 and the second substrate 2 may both be provided with a certain number of supporting posts 3, and correspondingly, the first substrate 1 is provided with a number of corresponding recesses and adhering parts 4 to adhere the supporting posts 3 to the second substrate 2, and the second substrate 2 is provided with a number of corresponding recesses and adhering parts 4 to adhere the supporting posts 3 to the first substrate 1.

In the display panel according to the embodiment of the invention, the supporting posts 3 are provided and fixed in the space between the substrates, such that the spacing between the substrates can be maintained in a long period of time, and uniformity of brightness of the display panel can be maintained in a long period of time. Provision of the adhering parts 4 at regions corresponding to the supporting posts 3 may increase bonding strength between the substrates. Moreover, as the adhering parts 4 are disposed in the recesses, the surface of the substrate where the adhering parts are located may have good evenness, and the material for forming the adhering parts 4 may be prevented from spreading out and influencing performances of its peripheral components.

In another aspect of the invention, there is provided a method of manufacturing the display panel.

Figure 3A:
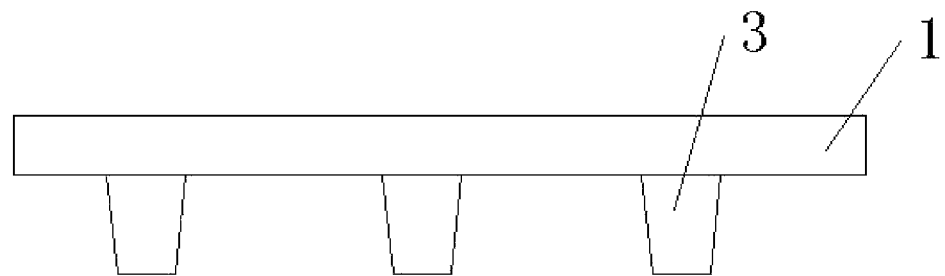
FIGS. 3a to 3c are illustrative schematic views showing a method of manufacturing the display panel according to an embodiment of the invention.
Figure 3B:
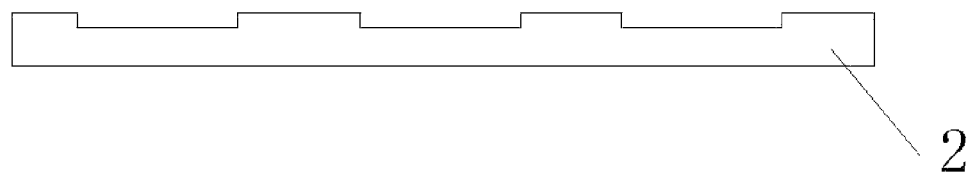
Figure 3C:
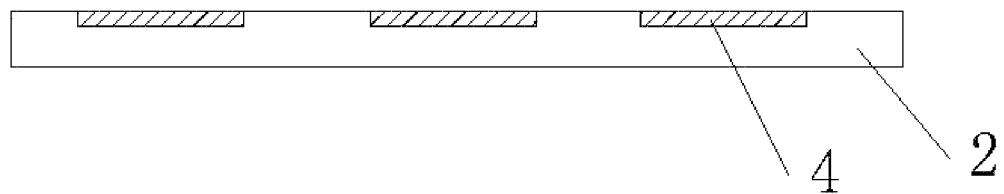

FIGS. 3a to 3c are illustrative drawings showing a method of manufacturing a display panel according to an embodiment of the invention. The method comprises the following steps.

Step 1: forming a first substrate 1 provided with a plurality of supporting posts 3.

In step 1, the first substrate 1 and the supporting posts 3 may be integrally formed from a plastic material or a resin material, as shown in FIG. 3a. The first substrate 1 having the supporting posts 3 may be manufactured through rolling and mould pressing.

Each of the supporting posts 3 may be configured to have a shape of a truncated pyramid, or it may be configured to have a shape of a cube or cylinder. Moreover, the supporting posts 3 may be formed at regions through which no light passes. For example, the supporting posts 3 may be formed at a region corresponding to a black matrix.

Step 2: forming a plurality of adhering parts 4 in a plurality of regions of the second substrate 2 corresponding to the plurality of supporting posts 3.

In step 2, the substrate 2 may be manufactured through existing production processes. A plurality of recesses are formed in regions of the second substrate 2 corresponding to the supporting posts 3 on the first substrate 1, as shown in FIG. 3b. Specifically, the recesses may be formed through a single patterning process in the second substrate 2. The patterning process may comprise:

applying a photoresist layer on the second substrate 2;

exposing and developing the photoresist layer with a halftone mask or a gray tone mask, such that photoresist in regions of the photoresist layer corresponding to the recesses are removed and photoresist in the rest of the photoresist layer are entirely maintained;

etching portions of the second substrate 2 that are not protected by the photoresist to form the recesses; and peeling off all remaining photoresist to remove all the photoresist.

After the recesses are formed in the second substrate 2, a molten pressure-sensitive adhesive may be applied into the recesses in an ink-jet printing manner to form a plurality of adhering parts, as shown in FIG. 3c.

The adhering parts formed through ink-jet printing may each have an uneven surface or have an irregular shape. Thus, after the adhering parts are formed, to ensure that the adhering parts 4 are filled in the recesses fully and have even upper surfaces, the second substrate 2 having the adhering parts 4 may be subjected to a heating process to melt the adhering parts completely. For example, a temperature range for the heating process is from 140 degrees to 160 degrees Celsius, and a time period for the heating process is from 30 to 120 seconds. After that, the second substrate 2 may be cooled down by cold air. The cooled and solidified adhering parts 4 are then formed in the recesses, and the material thereof will not be spread out and influence performances of other components.

Step 3: assembling the first substrate 1 and the second substrate 2 in a manner of placing them opposite to each other, such that the plurality of supporting posts on the first substrate contact respectively the plurality of adhering parts on the second substrate to form the display panel according to the embodiment as shown in FIG. 2.

In this step, firstly, the first substrate 1 and the second substrate 2 are disposed opposite to each other. It is noted that the supporting posts 3 and the adhering parts 4 should be in contact with each other in a one-to-one correspondence.

Secondly, to obtain sufficient bonding strength between the first substrate 1 and the second substrate 2, a first pressure towards the second substrate 2 may be applied to the first substrate 1, and at the same time, a second pressure towards the first substrate is applied to the second substrate 2. For example, both of the first pressure and the second pressure may be in a range from 2 to 6 bars, and a period of time for applying the pressures is in a range from 6 to 10 seconds. In such a manner, the bonding strength between the first substrate 1 and the second substrate 2 may be enhanced as much as possible.

In the display panel manufacturing according to the above method, the bonding strength between the supporting posts 3 and the adhering parts 4 is in a range of 1.5-3 N/mm$^2$. When the display panel is bent, a separating strength for separating the supporting posts 3 from the adhering parts 4 is in a range of 0.01-1 N/mm$^2$. Therefore, as the minimum bonding strength between the supporting posts 3 and the adhering parts 4 (i.e., 1.5 N/mm$^2$) is larger than the maximum separating strength for separating the supporting posts 3 from the adhering parts 4 (i.e., 1 N/mm$^2$), it can ensure that the supporting posts 3 and the adhering parts 4 are not separated, even if the display panel would be bent.

Alternatively, the plurality of adhering parts 4 may be formed on the second substrate 2 firstly, then the plurality of supporting posts 3 are formed on the first substrate 1 at positions corresponding to the plurality of the adhering parts 4.

With the method according to the embodiment of the invention, the supporting posts 3 are provided and fixed in positions in the place between the substrates, such that the spacing between the substrates can be maintained to be uniform in a long period of time, and uniformity of brightness of the display panel can be maintained in a long period of time. Provision of the adhering parts 4 at the regions corresponding to the supporting posts 3 may effectively increase the bonding strength between the substrates. Moreover, as the adhering parts 4 are disposed in the recesses, the surface of the substrate where the adhering parts are located may have a good flatness, and the material for forming the adhering parts 4 may be prevented from spreading out and influencing performances of its peripheral components.

In a further aspect of the invention, there is provided a display device.

According to an embodiment, the display device includes the display panel according to any one of the first embodiment and the second embodiment.

The display device may be an electronic book, a mobile phone, a tablet computer, a television, a display, a notebook computer, a digital frame, a navigator, or another product or component that has a display function.

The display device not only has the advantageous of the display panel according to the first embodiment or the second embodiment, but also has an improved display performance.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

What is claimed is:

1. A display panel, comprising:
    a first substrate;
    a second substrate disposed opposite to the first substrate;
    a plurality of supporting posts disposed on a side surface of the first substrate facing the second substrate; and
    a plurality of adhering parts disposed on a side surface of the second substrate facing the first substrate, the plurality of adhering parts corresponding to the plurality of supporting posts respectively,
    wherein two opposite side surfaces of each of the plurality of adhering parts are respectively in contact with corresponding one of the plurality of supporting posts and the second substrate to adhere the corresponding one of the plurality of supporting posts to the second substrate;
    wherein the side surface of the second substrate facing the first substrate is provided with a plurality of recesses in regions corresponding to the plurality of supporting posts respectively, the plurality of adhering parts being disposed in the plurality of recesses respectively; and
    wherein each of the plurality of adhering parts is configured to fully fill one corresponding recess of the plurality of recesses, such that upper surfaces of the plurality of adhering parts are flush with the side surface of the second substrate facing the first substrate.

2. The display panel according to claim 1, wherein an orthogonal projection of a top of each of the supporting posts on the second substrate falls within an orthogonal projection of an upper surface of a corresponding one of the plurality of adhering parts on the second substrate.

3. The display panel according to claim 1, wherein the adhering parts are formed of a pressure-sensitive adhesive material.

4. The display panel according to claim 3, wherein the adhering parts are formed of a hot melt pressure-sensitive adhesive material.

5. The display panel according to claim 1, wherein the supporting posts are formed of any one of a plastic material and a resin material.

6. A display device, comprising the display panel according to claim 1.

7. A display device, comprising the display panel according to claim 2.

8. A display device, comprising the display panel according to claim 3.

9. A display device, comprising the display panel according to claim 4.

10. A display device, comprising the display panel according to claim 5.

11. A method of manufacturing a display panel, comprising steps of:
    providing a first substrate provided thereon with a plurality of supporting posts;
    providing a second substrate;
    forming a plurality of recesses in regions of the second substrate corresponding to the plurality of supporting posts;
    applying molten pressure-sensitive adhesive into the plurality of recesses through ink-jet printing to form a plurality of adhering parts, such that each of the plurality of adhering parts fully fills one corresponding recess of the plurality of recesses, and upper surfaces of the plurality of adhering parts are flush with the side surface of the second substrate facing the first substrate; and
    assembling the first substrate and the second substrate in a manner of placing them opposite to each other, such that the plurality of supporting posts on the first substrate are in contact with the plurality of adhering parts on the second substrate respectively.

12. The method according to claim 11, wherein after the step of forming the plurality of adhering parts in the regions of the second substrate, the method further comprises:
    heating the second substrate to melt the plurality of adhering parts; and
    cooling the second substrate to cool and solidify the molten adhering parts.

13. The method according to claim 12, wherein a temperature for the heating is in a range from 140 degrees Celsius to 160 degrees Celsius, and a period of time for the heating is in a range from 30 seconds to 120 seconds.

14. The method according to claim 11, wherein the step of assembling the first substrate and the second substrate in a manner of placing them opposite to each other comprises:
    disposing the first substrate and the second substrate to be opposite to each other; and
    applying a first pressure to the first substrate in a direction towards the second substrate and applying a second pressure to the second substrate in a direction towards the first substrate simultaneously.

15. The method according to claim 14, wherein both of the first pressure and the second pressure are in a range from 2 to 6 bars, and a period of time for applying the first pressure and the second pressure is in a range from 6 seconds to 10 seconds.

* * * * *